United States Patent [19]

Stucchi

[11] Patent Number: 5,909,274
[45] Date of Patent: Jun. 1, 1999

[54] DEVICE FOR THE CHARACTERIZATION OF LASER BEAMS

[75] Inventor: Emanuele Stucchi, Bergamo, Italy

[73] Assignees: Cise S.p.A., Milan; Laser Point s.r.l., Segrate, both of Italy

[21] Appl. No.: 09/035,072

[22] Filed: Mar. 5, 1998

[30]   Foreign Application Priority Data

Mar. 7, 1997  [IT]  Italy ................................ MI97A0504

[51] Int. Cl.$^6$ ...................................................... G01J 1/00
[52] U.S. Cl. .......................................................... 356/121
[58] Field of Search ................................... 356/121, 138; 359/425, 426, 431

[56]     References Cited

U.S. PATENT DOCUMENTS

| | | | |
|---|---|---|---|
| 3,612,885 | 10/1971 | Arnaud | 250/217 |
| 5,064,284 | 11/1991 | Johnston, Jr. et al. | 356/121 |
| 5,078,491 | 1/1992 | Johnston, Jr. | 356/121 |
| 5,100,231 | 3/1992 | Sasnett et al. | 356/121 |
| 5,214,485 | 5/1993 | Sasnett et al. | 356/121 |
| 5,267,012 | 11/1993 | Sasnett et al. | 356/121 |
| 5,459,565 | 10/1995 | Aharon | 356/121 |

FOREIGN PATENT DOCUMENTS

| | | | |
|---|---|---|---|
| 0141605 | 11/1980 | Japan | 356/121 |
| 0113122 | 6/1985 | Japan | 356/121 |

OTHER PUBLICATIONS

Patent Abstracts of Japan, vol. 11, No. 201, Jun. 30, 1987.

Primary Examiner—Hoa Q. Pham
Attorney, Agent, or Firm—Jacobson, Price, Holman & Stern, PLLC

[57]     ABSTRACT

Device for the characterization of a laser beam according to a "Knife edge" method as defined by Standard ISO 11146. The device has a lens for the focalization of an incident laser beam, and a detector. Interception elements are located between said lens and said detector in order to intercept sequentially the focalized laser beam in a plurality of different positions along its axis of propagation. The interception elements are suitable to allow, in each one of said positions, the passage of a progressively increasing (or decreasing) portion of the vocalized laser beam starting from a condition of substantially total (or null) interception up to a condition of substantially null (or total) interception.

28 Claims, 3 Drawing Sheets

DEVICE FOR THE CHARACTERIZATION OF LASER BEAMS

BACKGROUND OF THE INVENTION

1. Field of the Invention

The present industrial invention refers to a device for the characterisation of a laser beam; more specifically the invention refers to a device for real-time measuring of the caustic curve of propagation of a laser beam.

2. Description of the Related Art

The laser beams propagation law allows to establish with precision the evolution of a laser beam in space whenever its minimum diameter and its divergence are known.

According to the Standard ISO 11146, the measurement of the diameter of a laser beam must be taken in at least ten planes orthogonal to the axis of propagation of the beam, to be chosen in such a way so that five planes fall within a so called "Rayleigh distance" and at least five additional planes fall outside by two "Rayleigh distances" as measured starting from the focal plane.

The evaluation of the diameter of the beam in each one of the selected points must be performed according to one of the following methods, in conformity with the aforementioned standard:

- "second moment": the diameter is given by the relation: d(z)=4o(z), where o(z) is the second moment of the distribution of intensity of the laser beam at the position z along the axis of propagation of the beam;
- "variable aperture": the diameter corresponds to the one of an aperture centred on the beam that transmits 86.4% of the incident energy;
- "moving slit": the diameter is given by twice the distance between the points in which the energy is 13.6% of the peak energy.
- "knife edge": the diameter is given by twice the distance between the points in which the energy reaches 13.6% and 86.4%.

The devices currently available, for example the ones for power lasers, do not allow to take a real-time measurement of the propagation caustic curve since they are very slow in acquiring a single profile of the beam, and in addition they involve the movement of some optical component in order to be positioned on the different spots along the propagation axis.

The most widely used methods of evaluation are the "second moment" and the "knife edge" ones. To determine the curve of propagation of the laser beam in a short time is therefore extremely difficult with the current devices; therefore they are not used in line during the system operation, but they are employed only to conduct periodic checks of the beam parameters.

A continuous and quick monitoring of the characteristics of the beams requires a much more flexible device than the ones currently available, in order to be able to carry out, in real-time, the correction of the spot position that would compensate the modifications introduced by the different optical paths travelled by the beam in a flying optics system, as for example for cutting or welding.

At present, there are devices based on two methods that allow to correct the characteristics of the focal spot at the working point. These act upon the optical characteristics of the optical components that transmit the beam, for example by modifying the radius of curvature of the reflecting mirrors (adaptive optics) or by controlling the position of the lens with respect to the working plane.

Both of these methods carry out the correction of the characteristics of the focal spot by utilising calculation algorithms that are based on the theoretic curve of propagation of the laser beam or by self-learning of the same, that is interpolating the values of the measured and subsequently recorded diameters along the beam path within the flying optics system. These methods are certainly effective, but they result to be not bound to the actual characteristics of the real beam that for example can change through time due to the effect of deterioration of the optical components of the laser source resonator and/or of the optical line, external to the source, conveying the beam to the working point.

SUMMARY OF THE INVENTION

In view of the state of the art described, object of the present industrial invention is to provide a device for the characterisation of a laser beam that measures its caustic curve of propagation in real time.

According to the present industrial invention, such object is attained by means of a device for the characterisation of a laser beam according to the "Knife edge" method, as defined in the Standard ISO 11146 comprising a lens for the focalization of an incident laser beam, and a detector, characterised in that, between said lens and said detector, means for the interception of the focalized laser beam are interposed, in order to intercept sequentially the focalized laser beam in a plurality of different positions along its axis of propagation, suitable to allow, in each one of said positions, the passage of a progressively increasing (or decreasing) portion of the focalized laser beam starting from a condition of substantially total (or null) interception up to a condition of substantially null (or total) interception.

Preferably, said interception means comprise a disc rotating around an axis of rotation lined up with the direction of propagation of the laser beam in such a way as to intercept the laser beam in correspondence of the periphery of the rotating disc, on that periphery having been created a circumferencial sequence of V-shaped grooves delimited by respective couples of knives, said couples of knives laying each one on a respective plane orthogonal to the axis of rotation of the disc and being in a number at least equal to the number of points along the direction of propagation of the beam in which the measurements are to be taken, said detector being suitable to measure the optical power of the portions of laser beam that flows through said couples of knives.

The following invention allows, for example in a laser system with flying optics such as laser systems for cutting and welding, to detect the position and the dimensions of the beam focal spot in the working plane in a continuous way and in real-time.

BRIEF DESCRIPTION OF THE DRAWINGS

These and other characteristics and advantages of the present invention will be made more evident by the following detailed description of some embodiments thereof, that are illustrated as non-limiting examples in the enclosed drawings, where.

DETAILED DESCRIPTION OF THE PREFERRED EMBODIMENTS

Figure 1:
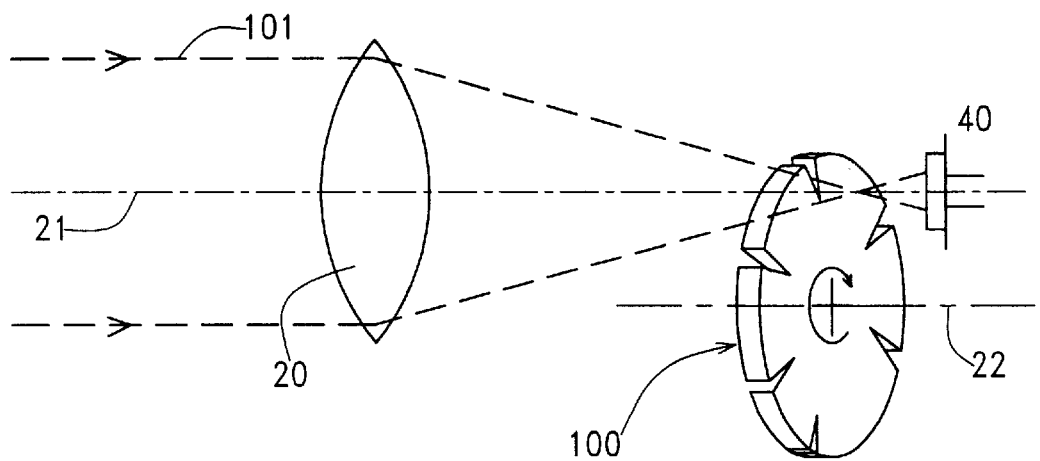
FIG. 1 shows schematically a device according to the present invention.

With reference to FIG. 1, there is shown a device for the characterisation of a laser beam 101 according to the present invention. The device comprises a lens 20 suitable to focalize the incident laser beam 101, possibly attenuated, that is generated by a laser source (not shown) of any known type, and a detector 40. Interposed between said detector 40 and the lens 20 there is a disc 100 rotating around an axis 22 parallel to the direction 21 of propagation of the laser beam 101.

Figure 2:
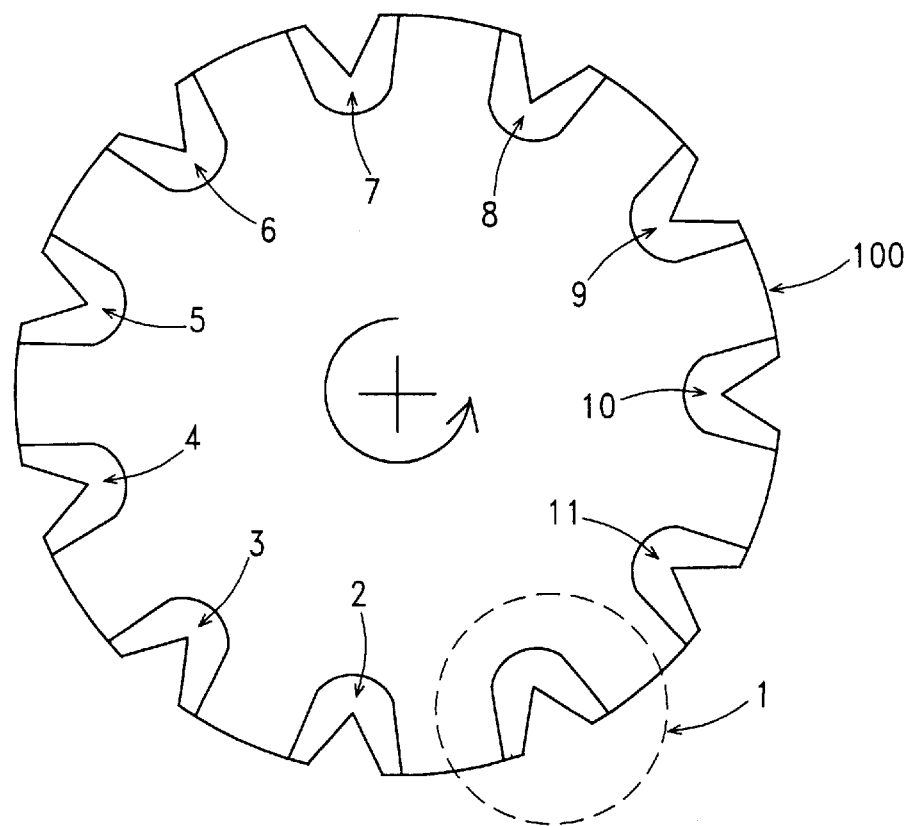
FIG. 2 is a front view of a rotating disc of the device of FIG. 1.

FIG. 2 shows the disc 100; on its periphery a circumferencial sequence of "V"-shaped grooves is created that are delimited by couples of knives 1–11 serving the purpose to enable the laser beam 101 to hit the detector 40.

Figure 3:
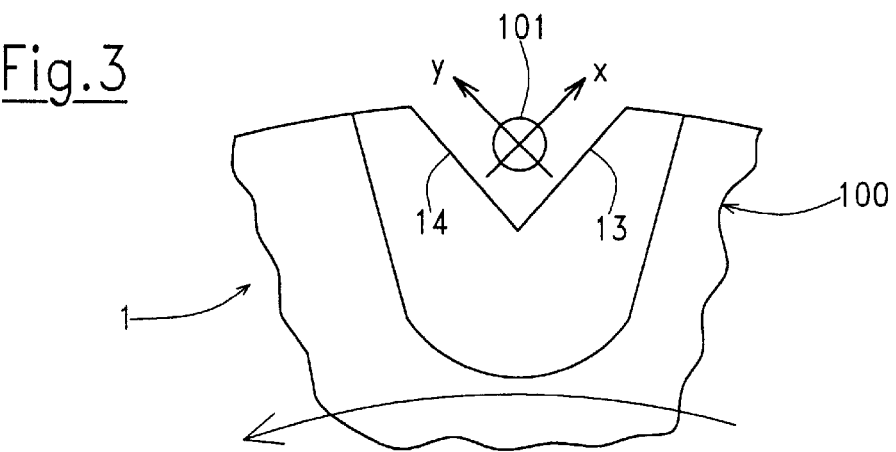
FIG. 3 is a magnified front view of a couple of knives of the disc of FIG. 2.

FIG. 3 shows an enlarged view of one of the eleven couples of knives 1–11 created in the disc 100. In particular it is possible to observe two knives 13 and 14 orthogonal to each other and the laser beam 101 passing between them.

Figure 4:
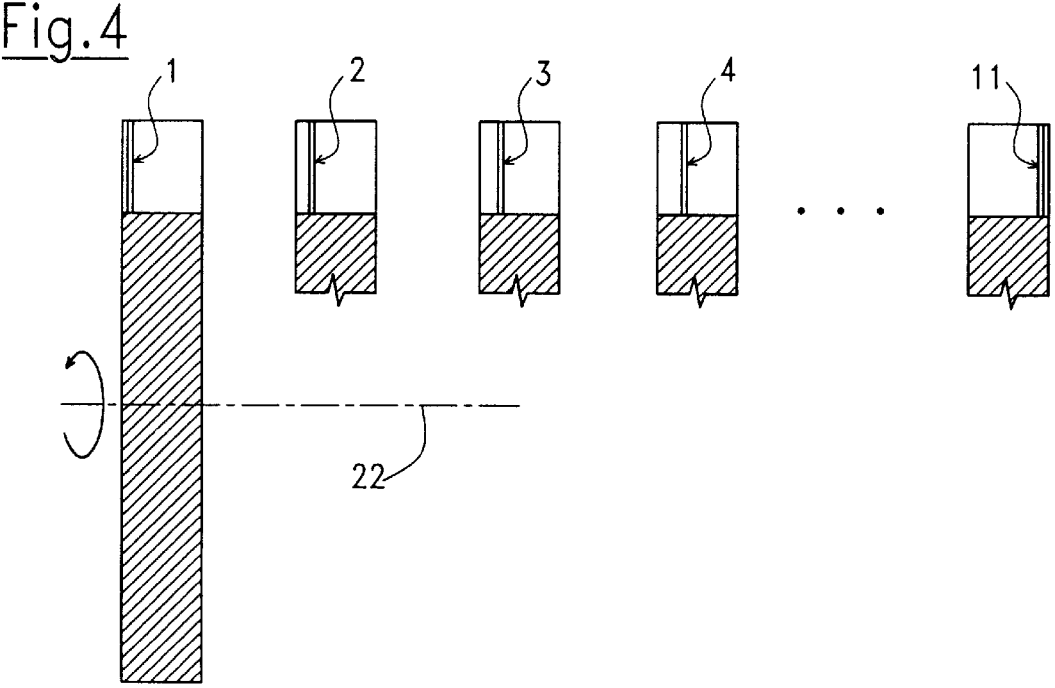
FIG. 4 shows some diametral sections of the rotating disc depicting the position of the couples of knives along the axis of the disc.

Said couples of knives 1–11, as illustrated in FIG. 4, do not lay on one same plane but on parallel planes orthogonal to the axis of rotation of the disc 100.

The knives can be made out as a piece with the rotating disc by machining its periphery, or, as in the case of the disc 100 being examined, they can be inserted in proper cavities created in the disc periphery. In the latter method, the knives can be positioned on any plane inside the body of the disc and orthogonal to the rotation axis 22 of the disc, thus conferring a certain degree of flexibility to the disc.

With reference to FIG. 1, when the disc 100 rotates, the laser beam 101, focalized by the lens 20, is initially completely intercepted by the disc 100 itself and subsequently by the knife 14 (FIG. 3).

Figure 5:
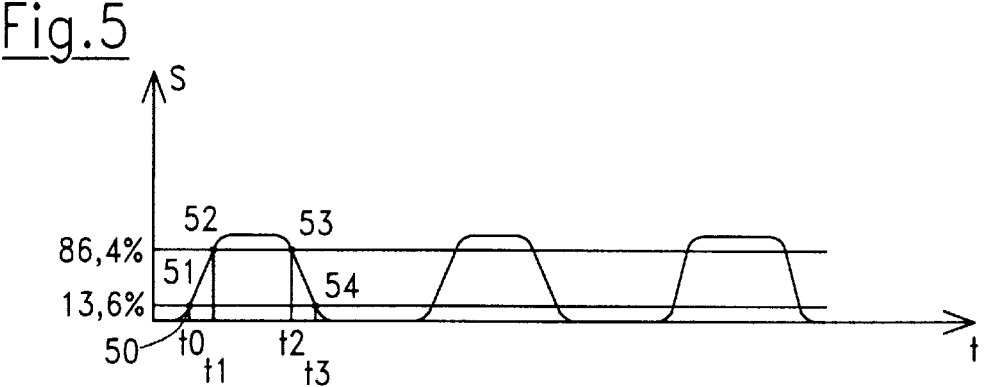
FIG. 5 shows an electric signal generated by a detector of the device of FIG. 1.

Going on with the rotation, the knife 14 starts intercepting only partially the laser beam 101. The remaining portion of the beam will be incident on the detector 40. The electrical signal generated by the detector 40, proportionally to the incident optical energy, will start rising, as shown in FIG. 5 by line 50–51. The time necessary to go from 13.6% of its peak value, that is point 51 in the Figure, to 86.4%, that is point 52, provides the measure of the laser beam diameter, which is proportional to the measured time (t1–t0).

The measure thus taken refers to the diameter of the beam along the direction orthogonal to the knife 14 (x axis direction in FIG. 3).

By continuing the rotation, the beam 101 initially gets to the detector without encountering any obstacles and then it is intercepted by the second knife 13. In this case, the time necessary for the signal generated by the detector to go from 86.4% of the peak value, represented by point 53, to 13.6%, represented by point 54, gives the measure of the diameter of the laser beam, which is proportional to the measured time (t3–t2), this time along the direction orthogonal to the knife 13 (y axis direction in FIG. 3).

Since the knives 13, 14 are orthogonal to each other, at each passage of a couple of knives 1–11 the measurement of the diameter of the laser beam 101 is taken in the direction x and y at a certain position z along the axis of propagation 21 of the laser beam 101.

The device thus conceived, at each complete disc rotation, takes the measurement, by the "knife edge" method as prescribed in the standard ISO 11146, of the diameters of the laser beam 101 along its axis of propagation 21 in a number of points along said axis equal to the number of knives couples 1–11.

Knowing the measure of the diameters of the laser beam 101 taken by each couple of knives 1–11 together with their position along the axis 21 of propagation of the laser beam itself allows to determine the caustic curve of propagation of the laser beam itself.

Both the radial and longitudinal position along the axis of the disc and the number of couples of knives are optimised as a function of the resolution of the measurement and of the performances that are requested to the device. If, indeed, one wants to privilege the response speed of the device then the number of couples of knives 1–11 will be reduced, on the contrary a high precision in individuating the focal position will require a greater number of these.

Figure 6:
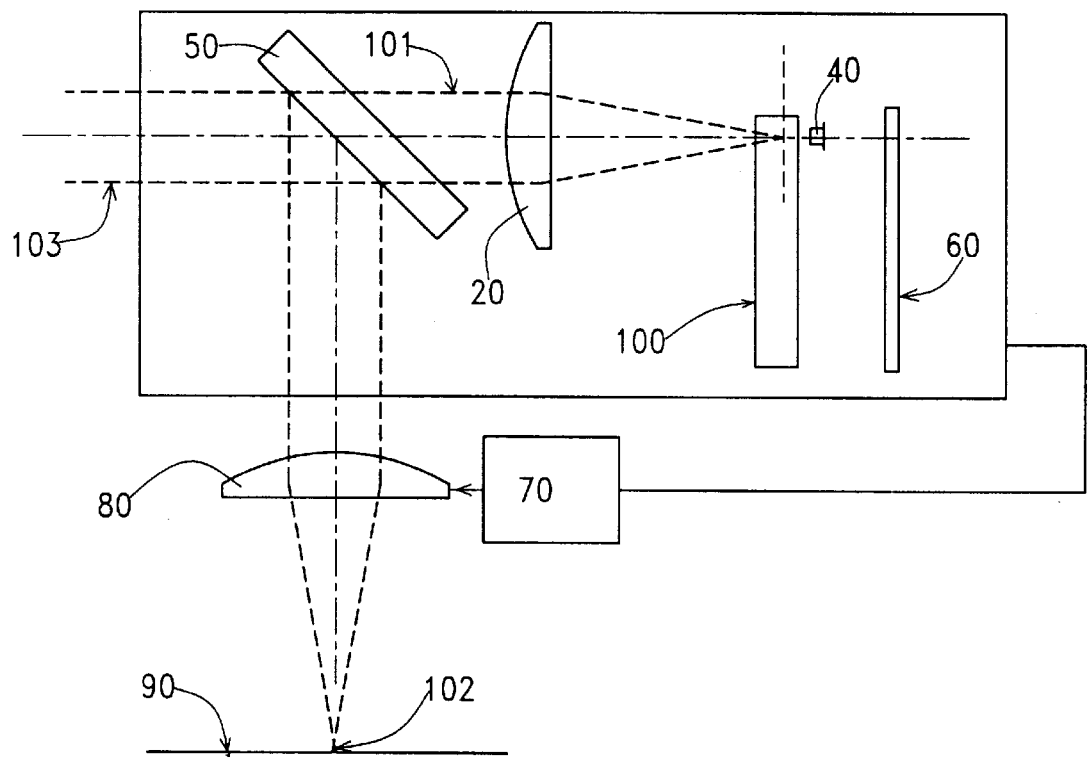
FIG. 6 shows schematically a first application of the device according to the invention.
Figure 7:
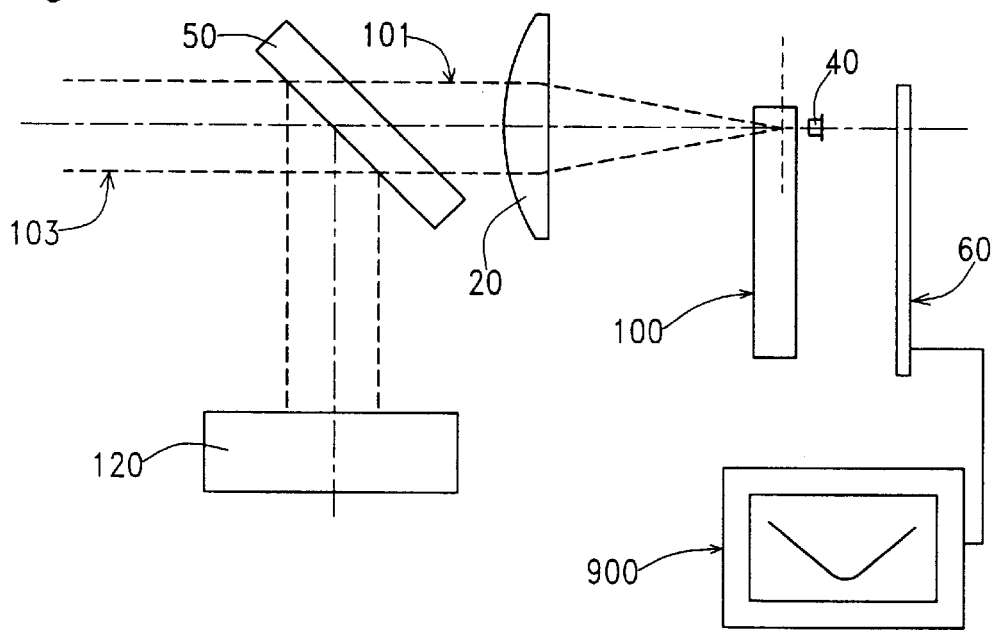
FIG. 7 shows schematically a second application of the device according to the invention.

FIGS. 6 and 7 show respectively a first and a second application of the device illustrated above.

In FIG. 6 the device is combined with a flying optics laser system. A beam splitter 50 picks a small portion 101 of the radiation from the main laser beam 103 and transmits it, by means of a lens 20, onto the rotating disc 100 where there are the apertures with the knives 13, 14 that intercept the laser beam 101 in order to perform the analysis. The detector 40 sends the electrical signals to a elaboration unit 60 which produces a feedback output signal for controlling an actuator 70. Such actuator 70 optimises the characteristics of the laser beam in the working plane 90. In this way for example it is possible to realise working procedures in which the dimensions of the spot 102 of the beam focalized by focalization optical means (schematised by a lens 80) on the piece being worked remain constant, or working procedures in which the position of the focal plane remains constant through variations of the optical path of the beam within the flying optics system.

FIG. 7 shows the scheme of a system for the characterisation of the laser beam for the evaluation, for example, of the quality factor K or of its inverse $M^2$. A beam splitter 50 deviates the main beam 103 towards an absorber 120 and transmits a fraction 101 of the incoming beam power towards the testing device.

The testing device comprises a focalization lens 20, a rotating disc 100 on which apertures with the knives 13, 14 are provided to intercept the beam, a detector 40 and an electronic elaboration circuit 60.

By means of a display 900 it is possible to visualise the trend of the diameters along the axis of propagation of the laser beam, as evaluated in correspondence of the planes at which the knives 13, 14 of the rotating disc 100 intercept the beam in orthogonal directions.

If the Rayleigh distance of the laser beam to be analysed is known, it is also possible to build a disc in which five couples of knives fall within such value and an equal number falls outside by twice this value, in order to obtain a device that can take the measurement of the optical parameters of the beam and the value of the quality factor K according to the standard ISO 11146.

In case one wants to use the same device to characterise laser beams having Rayleigh distances different from each other, according to the standard ISO 11146, it is possible to sample the laser beam by moving the disc along the beam axis of propagation by one or more steps of predefined value, in such a way that, for a given laser beam, it is possible to take the required sampling in at least five points within a Rayleigh distance and in at least five points outside by two Rayleigh distances.

I claim:

1. A device for the characterisation of a laser beam according to a knife edge method for measuring a diameter of the laser beam, the device comprising a lens for the focalization of an incident laser beam, a detector, and an interception means interposed between said lens and said detector, the interception means intercepting the focalized laser beam and having a rotating disc rotating around an axis of rotation parallel to a direction of propagation of the laser beam, the rotating disc including a circumferential sequence of beam interception elements located at different positions along said direction of propagation for intercepting the focalized laser beam in a respective sequence of different positions along said direction of propagation during the rotation of the rotating disc, each interception element allowing the passage of a progressively varying portion of the focalized laser beam between a condition of substantially total interception and a condition of substantially null interception.

2. The device according to claim 1, wherein said circumferential sequence of beam interception elements comprises a circumferential sequence of grooves formed in a periphery of the rotating disc, each groove being delimited by respective couples of knives, each said couples of knives laying on a respective plane orthogonal to the axis of rotation of the disc and being a number at least equal to the number of points along the direction of propagation of the beam in which measurements are to be taken, said detector being suitable to measure the optical power of the portions of laser beam that flows through said couples of knives.

3. The device according to claim 2, wherein the knives of each one of said couples of knives are orthogonal to each other.

4. The device according to claim 3, wherein said couples of knives are at least equal in number to the number of measuring points along the axis of propagation of the beam.

5. The device according to claim 4, wherein said couples of knives are made by machining of the periphery of said disc.

6. The device according to claim 4, wherein the couples of knives are inserted in proper cavities located in the periphery of said disc so that the couples of knives can be positioned in any one plane inside the disc.

7. The device according to claim 1, wherein said disc is mobile in the direction of propagation of the laser beam.

8. An apparatus for laser workings, comprising:
a laser source generating a laser beam;
optical means focusing the laser beam on a piece to be worked;
a device for the characterisation of the laser beam having a lens for the focalization of the laser beam, a detector and interception means for intercepting the focalized laser beam, the inception means interposed between said lens and said detector and including a rotating disc rotating around an axis of rotation parallel to a direction of propagation of the laser beam, the rotating disc including a circumferential sequence of beam interception elements located at different positions along said direction of propagation for intercepting the focalized laser beam in a respective sequence of different positions along said direction of propagation during the rotation of the rotating disc, each interception element allowing the passage of a progressively varying portion of the focalized laser beam between a condition of a substantially total interception and a condition of substantially null interception;
an elaboration unit that receives signals from said device and that generates control signals for said optical means so that the width of the spot produced by the laser beam on the surface of the piece being worked is maintained constant.

9. The apparatus according to claim 8, wherein said circumferential sequence of beam interception elements comprises a circumferential sequence of grooves formed in a periphery of the rotating disc, each groove being delimited by respective couples of knives, said couples of knives laying each one on a respective plane orthogonal to the axis of rotation of the disc and being a number at least equal to the number of points along the direction of propagation of the beam in which measurements are to be taken, said detector being suitable to measure the optical power of the portions of laser beam that flow through said couples of knives.

10. The apparatus according to claim 9, wherein the knives of each one of said couples of knives are orthogonal to each other.

11. The apparatus according to claim 10, wherein said couples of knives are at least equal in number to the number of measuring points along the axis of propagation of the beam.

12. The apparatus according to claim 11, wherein said couples of knives are made out as a piece with said disc by proper machining of the periphery of said disc.

13. The apparatus according to claim 11, wherein the couples of knives are inserted in proper cavities realized in the periphery of said disc and positioned in any one plane inside the disc.

14. The apparatus according to claim 8, wherein said disc is mobile in the direction of propagation of the laser beam.

15. An apparatus for measuring the characteristics of a laser beam, comprising:
optical means suitable to attenuate the incident optical power, the optical means producing an attenuated laser beam;
a device for the characterisation of the laser beam having a lens for the focalization of the attenuated laser beam, a detector and interception means for intercepting the focalized attenuated laser beam, the interception means interposed between said lens and said detector and having a rotating disc rotating around an axis of rotation parallel to a direction of propagation of the attenuated laser beam, the rotating disc having a circumferential sequence of beam interception elements located at different positions along said direction of propagation for intercepting the focalized attenuated laser beam in a respective sequence of different positions along said direction of propagation during the rotation of the rotating disc, each interception element allowing the passage of a progressively varying portion of the focalized attenuated laser beam between a condition of substantially total interception and a condition of substantially null interception;
an elaboration unit; and
display means controlled by said elaboration unit in order to evaluate the parameters necessary to individuate the propagation caustic curve of the laser beam.

16. The apparatus according to claim 15, wherein said circumferential sequence of beam interception elements comprises a circumferential sequence of grooves formed in a periphery of the rotating disc, each groove delimited by respective couples of knives, said couples of knives laying on respective plane orthogonal to the axis of rotation of the disc and being a number at least equal to the number of points along the direction of propagation of the beam in which measurements are to be taken, said detector being suitable to measure the optical power of the portions of laser beam that flow through said couples of knives.

17. The apparatus according to claim 16, wherein the knives of each one of said couples of knives are orthogonal to each other.

18. The apparatus according to claim 17, wherein said couples of knives are at least equal in number to the number of measuring points along the axis of propagation of the beam.

19. The apparatus according to claim 18, wherein said couples of knives are made by proper machining the periphery of said disc.

20. The apparatus according to claim 18, wherein couples of knives are inserted in proper cavities realized in the periphery of said disc and positioned in any one plane inside the disc.

21. The apparatus according to claim 15, wherein said disc is mobile in the direction of propagation of the laser beam.

22. An apparatus for laser workings, comprising:

a laser source generating a laser beam;

optical means for focusing the laser beam on a piece to be worked;

a device for the characterisation of the laser beam comprising a lens for the focalization of the laser beam, a detector and interception means for intercepting the focalized laser beam, the interception means interposed between said lens and said detector and having a rotating disc rotating around an axis of rotation parallel to a direction of propagation of the laser beam, the rotating disc being provided with a circumferential sequence of beam interception elements located at different positions along said direction of propagation for intercepting the focalized laser beam in a respective sequence of different positions along said direction of propagation during the rotation of the rotating disc, each interception element allowing the passage of a progressively varying portion of the focalized laser beam between a condition of substantially total interception and a condition of substantially null interception; and an elaboration unit that receives signals from said device and that generates control signals for said optical means so that the distance between the focal plane and the surface of the piece being worked is maintained constant.

23. The apparatus according to claim 22, wherein said circumferential sequence of beam interception elements comprises a circumferential sequence of grooves formed in a periphery of the rotating disc, each groove delimited by respective couples of knives, each said couples of knives laying on a respective plane orthogonal to the axis rotation of the disc and being a number at least equal to the number of points along the direction of propagation of the beam in which the measurements are to be taken, said detector being suitable to measure the optical power of the portions of laser beam that flows through said couples of knives.

24. The apparatus according to claim 23, wherein the knives of each one of said couples of knives are orthogonal to each other.

25. the apparatus according to claim 24, wherein said couples of knives are at least equal in number to the number of measuring points along the axis of propagation of the beam.

26. The apparatus according to claim 25, wherein said couples of knives are made by proper machining of the periphery of said disc.

27. The apparatus according to claim 25, wherein the couples of knives are inserted in proper cavities realized in the periphery of said disc so that the couples of knives can be positioned in any one plane inside the disc.

28. The apparatus according to claim 22, wherein said disc is mobile in the direction of propagation of the laser beam.

* * * * *